United States Patent [19]

Banton et al.

[11] Patent Number: 4,941,721
[45] Date of Patent: Jul. 17, 1990

[54] RASTER SCANNING SYSTEM UTILIZING OVERFILLED POLYGON FACET DESIGN

[75] Inventors: Martin E. Banton, Fairport; Michael E. Harrigan, Webster, both of N.Y.

[73] Assignee: Xerox Corporation, Stamford, Conn.

[21] Appl. No.: 359,604

[22] Filed: Jun. 1, 1989

[51] Int. Cl.⁵ .................... G02B 26/10; G02B 13/18
[52] U.S. Cl. ................................... 350/6.8; 350/432
[58] Field of Search .................... 350/6.7, 6.8, 432

[56] References Cited

U.S. PATENT DOCUMENTS 3,995,110 11/1976 Starkweather ................... 350/6.8
4,213,157 7/1980 De Benedictis et al. .......... 350/6.8
4,247,160 1/1981 Brueggemann ................... 350/6.8
4,308,544 12/1981 Lucero et al. ..................... 350/6.8
4,492,435 1/1985 Banton et al. ..................... 350/360

Primary Examiner—Bruce Y. Arnold
Assistant Examiner—Ronald M. Kachmarik

[57] ABSTRACT

In a raster output scanning (ROS) printer, an overfilled polygon design is enabled by using a high power laser diode to compensate for low efficiency of an overfilled design and by using an aspheric lens assembly to provide a flat beam illumination profile at each polygon facet.

3 Claims, 2 Drawing Sheets

RASTER SCANNING SYSTEM UTILIZING OVERFILLED POLYGON FACET DESIGN

BACKGROUND OF THE INVENTION

The invention relates to a raster scanning system and, more particularly, to a scanning system utilizing a rotating polygon whose facets are uniformly illuminated in an overfilled design.

Many prior art raster output scanners (ROS) utilize a rotating polygon having flat reflective surfaces, or facets, in parallel with the axis of rotation of the polygon. In a typical system, a beam is emitted from a light source such as a helium-neon laser. The light is directed through a pre-polygon conditioning optics, modulated according to an input electrical signal, onto the rotating polygon surfaces. The high speed rotation of the polygon, typically in 3 to 15 krpm range, then scans the beam through a post-polygon conditioning lens and images the laser spot across the full process width of a photosensitive image plane. In these prior art ROS systems, the pre-polygon conditioning optics typically are incorporated in an underfilled facet design; e.g. the light beam directed against the rotating polygon illuminates only a portion of each rotating surface (facet). Overfilled facet designs, where the light beam completely illuminates each facet and a small portion of adjacent facets, have been used to some degree, but have not gained wide acceptance. Comparing the two designs, in an overfilled design the facet size required to produce a given spot size at the image plane is greatly reduced allowing many more facets to be accommodated on the same diameter polygon. This, in turn, permits the scan system to operate it at relatively low rotation rate permitting the use of less powerful (and less expensive) polygon motor drives. This advantage has, heretofore, been more than offset, by two factors: low throughput efficiency and non-uniform illumination at the polygon facets. In order to tolerate the low efficiency (typically 10 to 15%), a higher powered laser diode is required. The non-uniformity problem is illustrated with reference to FIG. 1. FIG. 1 shows an illumination profile in an overfilled facet design. A beam 2, derived from a laser source, has a Gaussian spot shape which has been expanded so that more than one facet 4 of rotating polygon 6 is illuminated. As the polygon 6 rotates in the indicated direction to scan the spot across an output medium (not shown), the amount of light reflected to the medium varies because the facets are sampling different parts of the Gaussian illumination profile and the effective area of the polygon is changing.

When comparing the advantages and disadvantages of the two polygon configurations, the underfilled design has been preferred because of the relatively high throughput efficiency (50%). However, the lower rotation rate of the overfilled design makes it a desirable alternative if the uniformity problem can be resolved. According to the present invention, a pre-polygon optical system, including an aspherical lens system, provides for uniform spot illumination of a polygon facet operating in an overfilled mode. It is known to produce a uniform flat intensity profile from a Gaussian input using two spherical lenses. U.S. Pat. No. 4,492,435, FIG. 3, shows a lens system 58 which produces a collimated light beam which is supplied to a total internal reflection type of modulator. This type of lens system is unsuitable, however, for producing uniform profile inputs to a polygon surface because of high aberration (up to 10 wavelengths).

According to another aspect of this invention, the spot illumination at each facet of a rotating polygon is increased at the edges to compensate for illumination fall-off due to the effective size change at the polygon surface as the beam hits it head on at center of scan and at an angle at the ends of the scan. More particularly, the invention is directed towards a raster input scanning system utilizing an overfill polygon facet design for forming line images at a photosensitive medium comprising:

means for providing a beam of radiant energy,
means for modulating said beam energy in response to electrical signals,
means for expanding the modulated beam,
a polygon having at least one reflective facet positioned in the optical path of said modulated beam and adapted to scan said spot across said medium, and
an aspheric lens system positioned between said modulating means and said polygon, said aspheric lens adapted to transform the modulated output beam into a beam having a generally flat uniform intensity profile which overfills said facet as it rotates therethrough.

DETAILED DESCRIPTION OF THE INVENTION

Figure 1:
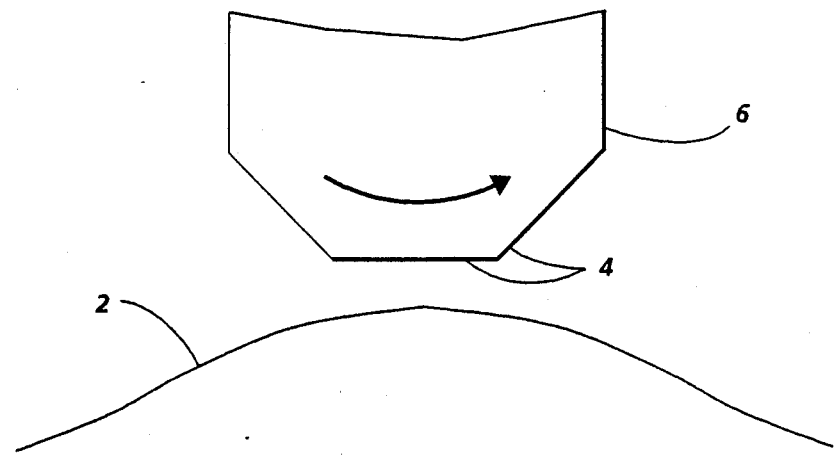
FIG. 1 shows an illumination profile in a prior art design for an overfilled polygon facet.
Figure 2:
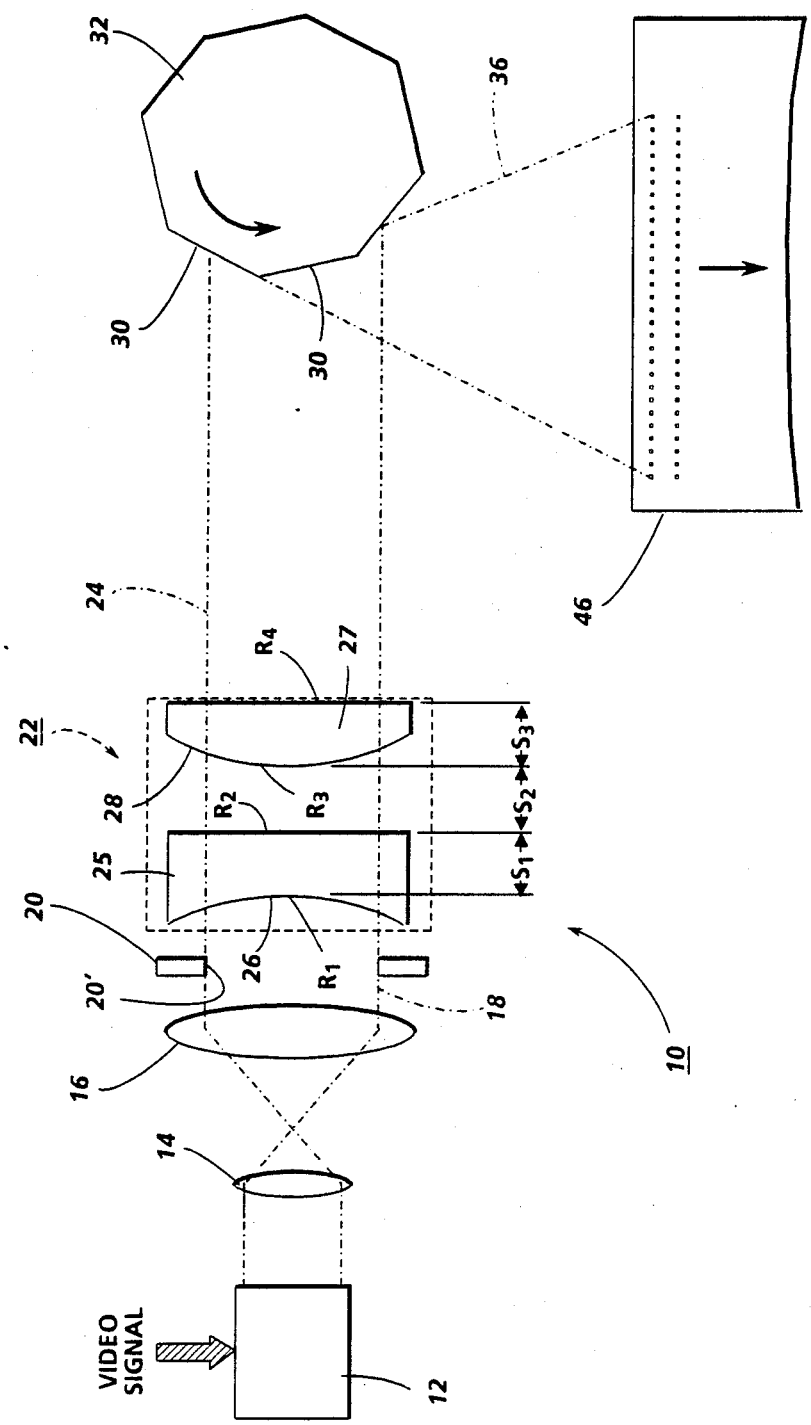
FIG. 2 is a schematic bottom plan view of a polygon ROS system operating in an overfilled facet design, and including a preferred embodiment of the aspheric lens of the present invention.

Referring of FIG. 2 of the drawings, there is shown a ROS system 10 of the type having an overfilled polygon facet design and incorporating a pre-polygon lens which, according to the invention, produces a flat illumination profile at each polygon facet. As shown, a laser diode 12, which is a preferred embodiment, has an output power rating of 15 mw which serves as the source of high intensity collimated radiation. The laser diode 12 is self-modulating and the output beam of light is modulated in conformance with the information contained in a video signal. The modulated beam is expanded by the two lens beam expanders 14, 16 following which the expanded beam of light 18, having the Gaussian intensity profile shown in FIG. 1, passes through a line-like aperture or slit 20′ formed by aperture plate 20. The beam 18 then passes through aspheric lens system 22, described in further detail below. Aspheric lens system 22 transforms the collimated non-uniform Gaussian sheet light beam profile 18 into a collimated flat intensity beam 24 directed across the width of a facet 30 of rotating polygon 32, the beam overfilling each facet. Lens system 22 comprises a first negative lens element 25 with an aspheric surface 26 having a radius $R_1$ and a positive second lens element 27 having an aspheric surface 28 with a radius of $R_3$. The design parameters of lens system 22 are shown in the following Table.

TABLE

| LENS | RADIUS (nm) | SPACING (nm) | REFRACTIVE INDEX (GLASS) |
|---|---|---|---|
| $25R_1$ | −22.07581 | $S_1 = 10.16$ | 1.618 |
| $25R_2$ | 127.0000 | $S_2 = 88.90$ | 1.000 |
| $27R_3$ | 73.43002 | $S_3 = 15.24$ | 1.618 |
| $27R_4$ | $\alpha$ | | |

Figure 3:
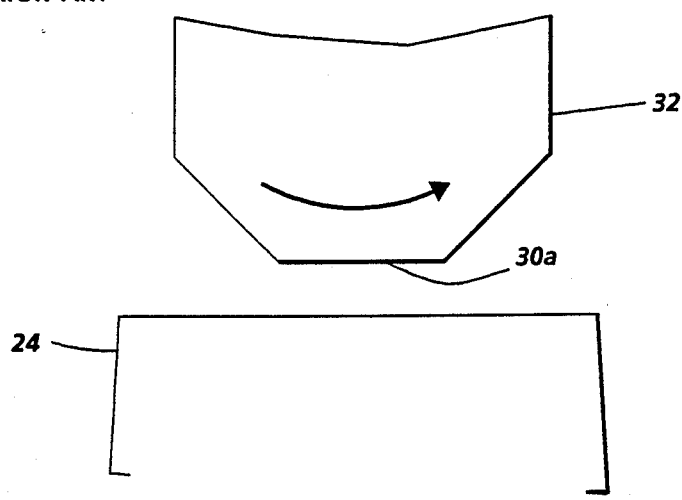
FIG. 3 shows a flat illumination profile of an illuminated overfilled facet shown in FIG. 2.
Figure 4:
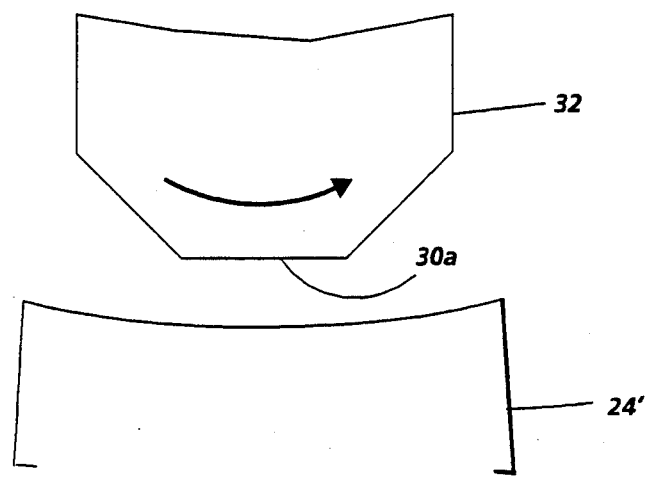
FIG. 4 shows an illumination profile having a flat centered profile with increased edge profiles.

The facets 30 are mirrored surfaces which reflect the light impinging thereon. With the rotation of polygon 32 in the direction indicated by the arrow, light beam 36 is reflected from each illuminated facet 30 and passes through a series of post-polygon lenses (not shown but conventional in the art) which image the beam 36 across the full process width at a photosensitive image plane 46. The beam 36 strikes the image plane with a uniform intensity except for the fall-off due to the effective size change at the polygon facet as the beam hits it head on at center of scan and in an angle at the ends of the scan. FIG. 3 shows the illumination profile 24 at a polygon facet 30a in a center of scan position. Depending on the design details and ROS requirements for a particular system, the slight edge non-uniformity manifested at the image plane may be tolerable. However, according to another aspect of the present invention, the aspheric surface of 26, 28 of lens elements 25, 27 can be further modified to compensate for the effects of the edge fall-off described above producing the Gaussian profile shown in FIG. 4 to convert the Gaussian system to a profile which has slightly curved peaked edges. Thus, as the polygon facet rotates to scan the spot across the image planes, the edge drop-off is compensated for and the amount of light reflected to the image plane remains constant.

While the invention has been described with reference to the structure disclosed, it is not confined to the details set forth, but is intended to cover such modifications or changes as may come within the scope of the following claims.

What is claimed is:

1. A raster input scanning system utilizing an overfilled polygon facet design for forming lens images at a photosensitive medium comprising:
   means for providing a beam of radiant energy,
   means for modulating said energy beam in response to electrical signals,
   means for expanding the modulated beam,
   a polygon having at least one reflective facet positioned in the optical path of said modulated beam and adapted to scan said spot across said medium, and
   an aspheric lens system positioned between said modulating means and said polygon, said aspheric lens adapted to transform the modulated output beam into a beam having a generally flat uniform intensity profile which overfills said facet as it rotates therethrough, said aspheric lens system comprising a first negative lens element and a second positive lens element each of said lens elements having one aspherical surface, and one generally planar surface.

2. The scanning system of claim 1 wherein said aspheric lens transforms said modulated output into a collimated beam having a curved profile with peaked edges.

3. The scanning system of claim 1 wherein such aspheric lens system has the following parameters:

| LENS | RADIUS (nm) | SPACING (nm) | REFRACTIVE INDEX (GLASS) |
|---|---|---|---|
| $25R_1$ | −22.07581 | $S_1 = 10.16$ | 1.618 |
| $25R_2$ | 127.0000 | $S_2 = 88.90$ | 1.000 |
| $27R_3$ | 73.43002 | $S_3 = 15.24$ | 1.618 |
| $27R_4$ | $\alpha$ | | |

\* \* \* \* \*

UNITED STATES PATENT AND TRADEMARK OFFICE
CERTIFICATE OF CORRECTION

PATENT NO. : 4,941,721
DATED : July 17, 1990
INVENTOR(S) : Martin E. Banton, Michael E. Harrigan It is certified that error appears in the above-indentified patent and that said Letters Patent is hereby corrected as shown below:

Col. 2, line 9 change "raster input scanning" to -- raster output scanning --; and Col. 4, lines 4 and 5 change to read:
1. A raster output scanning system utilizing an overfilled polygon facet design for forming line images at a Signed and Sealed this Twelfth Day of April, 1994

Attest:

BRUCE LEHMAN

Attesting Officer

Commissioner of Patents and Trademarks